United States Patent
Kiechl et al.

(10) Patent No.: US 11,820,050 B2
(45) Date of Patent: Nov. 21, 2023

(54) METHOD OF MANUFACTURING A BICYCLE COMPONENT, AND BICYCLE COMPONENT

(71) Applicant: DT SWISS INC., Grand Junction, CO (US)

(72) Inventors: Olivier Kiechl, Langendorf (CH); Kevin Steiner, Pieterlen (CH)

(73) Assignee: DT SWISS INC., Grand Junction, CO (US)

( * ) Notice: Subject to any disclaimer, the term of this patent is extended or adjusted under 35 U.S.C. 154(b) by 50 days.

(21) Appl. No.: 17/093,888

(22) Filed: Nov. 10, 2020

(65) Prior Publication Data
US 2021/0138693 A1    May 13, 2021

(30) Foreign Application Priority Data
Nov. 11, 2019   (DE) .......................... 102019130341.9

(51) Int. Cl.
| | |
|---|---|
| B29C 33/42 | (2006.01) |
| B29C 33/38 | (2006.01) |
| B29C 70/46 | (2006.01) |
| B60B 5/02 | (2006.01) |
| B29L 31/32 | (2006.01) |
| B60B 21/00 | (2006.01) |
| B29K 105/08 | (2006.01) |

(52) U.S. Cl.
CPC .......... *B29C 33/42* (2013.01); *B29C 33/3842* (2013.01); *B29C 70/46* (2013.01); *B60B 5/02* (2013.01); *B29K 2105/0872* (2013.01); *B29L 2031/32* (2013.01); *B60B 21/00* (2013.01); *B60B 2360/36* (2013.01)

(58) Field of Classification Search
CPC ....... B29C 70/46; B29C 70/345; B29C 33/42; B29C 33/424; B29C 33/3842; B60B 21/062; B29L 2031/32; B29L 2031/3091
See application file for complete search history.

(56) References Cited

U.S. PATENT DOCUMENTS

| | | | |
|---|---|---|---|
| 5,705,254 A | * 1/1998 | Morinaga | ............. B29C 33/424 428/338 |
| 10,118,315 B1 | 11/2018 | Cheng et al. | |

(Continued)

FOREIGN PATENT DOCUMENTS

| | | | | |
|---|---|---|---|---|
| EP | 2765009 A1 | * | 8/2014 | ............. B60B 1/003 |
| EP | 2765009 A1 | | 8/2014 | |

OTHER PUBLICATIONS

Tomlinson, Sarah Elizabeth, "Understanding the friction between human fingers and contacting surfaces", PhD diss., University of Sheffield, 2009. p. 49 (Year: 2009).*

Primary Examiner — Jerzi H Moreno Hernandez
(74) Attorney, Agent, or Firm — Greer, Burns & Crain, Ltd (57) ABSTRACT

A method of manufacturing a bicycle component having a component body formed at least partially of a fibrous composite material in a shaping mold. A shaping area of the shaping mold which serves to shape an outer section of the component body is provided with at least one intended surface roughness. At the same time, an intentional surface roughness is provided for the outer section by means of the surface roughness of the shaping area during manufacture of the outer section, to inhibit surface imperfections of the shaped outer section.

16 Claims, 3 Drawing Sheets

(56) References Cited

U.S. PATENT DOCUMENTS

| | | | |
|---|---|---|---|
| 2007/0205654 A1* | 9/2007 | Denk | B29C 70/462 301/95.102 |
| 2008/0088057 A1* | 4/2008 | Henrotte | B29C 33/10 425/46 |
| 2008/0224440 A1* | 9/2008 | Masuda | B62M 3/00 264/109 |
| 2010/0090518 A1* | 4/2010 | Schiers | B29C 70/342 156/154 |
| 2011/0017385 A1 | 1/2011 | Liu et al. | |
| 2012/0006470 A1* | 1/2012 | Lew | B29C 70/345 156/193 |
| 2013/0068363 A1* | 3/2013 | Ikemura | B29C 33/424 152/450 |
| 2013/0256944 A1 | 10/2013 | Victor et al. | |
| 2014/0117745 A1* | 5/2014 | Wilke | B60B 5/02 204/192.15 |
| 2015/0001748 A1* | 1/2015 | Suh | B29C 33/3842 264/40.1 |
| 2015/0096672 A1 | 4/2015 | Tsai et al. | |
| 2015/0306907 A1* | 10/2015 | Granieri | B60B 21/08 205/205 |
| 2017/0100960 A1* | 4/2017 | Fabris | B29C 69/001 |
| 2018/0117829 A1* | 5/2018 | Brady | B29C 70/46 |
| 2019/0315074 A1* | 10/2019 | Gadow | B29C 70/305 |
| 2019/0316390 A1* | 10/2019 | Wilke | B29C 45/02 |

\* cited by examiner

METHOD OF MANUFACTURING A BICYCLE COMPONENT, AND BICYCLE COMPONENT

BACKGROUND

The present invention relates to a method of manufacturing a bicycle component having at least one component body, formed at least partially of at least one fibrous composite material in at least one shaping mold, and such a bicycle component.

Bicycle components of fibrous composite materials provide a particularly low weight in relation to their strength, which is why they tend to be employed in competition oriented sports bicycles. However, after shaping out the component body, extensive post-processing is often required in order to remove any flaws, such as small dips or craters or score marks. Although these surface imperfections do not impair stability as a rule, they are clearly visible to the naked eye. Therefore, post-processing often serves to optimize the optical quality and for example to fulfil the specific requirements of high-end bicycle components.

A fill mass tends to be applied so as to fill up any craters and to produce a plane, smooth surface. Alternatively or additionally, uneven surfaces may be removed mechanically. This is as a rule followed by varnish coating to provide a uniform surface coating. Varnish coating is usually preceded by sanding to provide reliable durability.

In view of this, it is the object of the present invention to provide an uncomplicated while reliable solution in respect of the afore-mentioned surface imperfections when manufacturing bicycle components.

SUMMARY

The method according to the invention serves for manufacturing a bicycle component having at least one component body. The bicycle component is in particular provided for an at least partially muscle-powered bicycle. The component body is at least partially, in particular completely, formed of at least one fibrous composite material in at least one shaping mold (in particular first-time or originally). The component body is in particular at least partially, in particular completely, primarily formed from the fibrous composite material, in the shaping mold, i.e. first given its shape therein. The component body is thus in particular generated respectively originally/first shaped out from the fibrous composite material, which is (prepared and) not yet hardened respectively non-rigid (and in particular still amorphous in respect of the final shape of the component body; although the fibrous composite material may show an intended fiber orientation and/or fiber layering respectively lamination, e.g. prepregs may be provided). Such first-time shaping is also referred to as primary forming. At least one shaping area of the shaping mold, which forms at least one outer section of the component body, is provided with at least one intended surface roughness. An intended surface roughness for the outer section is in particular generated (in particular synchronously) while generating the outer section by means of the surface roughness of the shaping area. The surface roughness is preferably incorporated in the shaping area. This in particular inhibits surface imperfections of the shaped outer section.

The method according to the invention offers many advantages. Of particular advantage is the surface roughness in the shaping area, since it reliably prevents imperfections in the surface of the shaped outer section. The controlled generation of the surface roughness in the shaping mold considerably increases the surface uniformity and optical quality. Thus, extensive surface post-processing following the shaping process can be eliminated. Thus, immediately after shaping out, the outer portion shows a surface roughness generated by the surface roughness of the shaping area. Thus, the outer section already shows a completely, or at least largely, finished surface, directly after shaping out. A particular advantage is also that incorporating the surface roughness in the shaping mold is particularly easy. On the whole, the invention allows particular economy and reliability of achieving high-quality optical appearance or a higher-grade optical appearance of the surfaces of bicycle components.

The bicycle component manufactured is preferably a rim for a wheel for an at least partially muscle-powered bicycle. The rim in particular comprises at least one rim body providing the component body. The rim body is formed in particular at least partially of the fibrous composite material in the shaping mold. The outer section is in particular a part of the rim body. This configuration employs the method particularly advantageously. Thus, manufacturing rims with particularly uniform and flawless surfaces is very uncomplicated.

In the scope of the present invention, the term "bicycle component" may be replaced by the term "rim", and the term "component body", by the term "rim body".

The rim body in particular comprises at least one rim flank and preferably at least two rim flanks. The rim flanks in particular each extend laterally along the rim. The rim flanks are, in particular, axially disposed on the rim. The rim flanks in particular extend in the radial direction, circumferentially surrounding the rim. It is possible for the rim flanks to meet at a radially inwardly end of the rim body and/or at a radially outwardly end of the rim body. In this spot, the rim flanks may be directly or indirectly interconnected through at least one other structure, e.g. a rim base or rim well.

It is possible for the rim body to comprise at least one rim base and/or at least one rim well. In particular, at least two rim flanks connecting the rim base with the rim well are provided. The outer section is, in particular, provided by the rim flanks and/or the rim base and/or the rim well. The outer section in particular extends over the entire outside surface of the rim body and preferably at least one, and in particular both of the rim flanks and/or the rim base and/or the rim well, that is visible in the normal and regular proper condition. The rim flanks may show a rim flange each.

The rim body is, in particular, provided by at least one separately shaped part. It is possible for the rim body to consist of at least two separately shaped parts, which are joined together. Each of the parts may comprise at least one of the rim flanks. The outer section may extend over both parts, or over one part only. The parts are, in particular, shaped successively in a shaping mold or concurrently in several shaping molds. Then the shaping molds, which serve to shape a part provided with the outer section, are in particular each provided with at least one shaping area showing the surface roughness.

The bicycle component is in particular provided for an at least partially muscle-powered bicycle. The bicycle component manufactured may also be a hub and/or fork and/or seat post and/or brake and/or handlebar and/or stem and/or frame. Then, the component body is, in particular, provided by a hub sleeve and/or fork bridge and/or fork leg and/or seat post and/or brake arm and/or handlebar tube and/or stem tube and/or frame section. Accordingly, the term "bicycle component" may be replaced by the respective term, "hub", "fork", "seat post", "brake", "frame", "handlebar".

In all the configurations, it is particularly preferred at least for the outer section to be coated, preferably varnished. The outer section is, in particular, coated at least partially and preferably substantially completely, in particular completely. The varnish coating applied is preferably semitransparent or transparent. The particular advantage thereof is that the outer section manufactured according to the invention can receive an optimal varnish coating even without any pretreatment. For example, troweling or filling may be dispensed with.

In particular, at least one coating, preferably at least one varnish coating, is applied. The coating in particular comprises at least one coat. The varnish coating in particular comprises at least one varnish coat and/or at least one base coat and/or at least one top coat. The varnish coat is, in particular, disposed above the base coat and/or beneath the top coat.

Particularly preferably, the shaping area is provided with a surface roughness which is suitable and configured to improve the adhesion for an applied coating layer. Thus, one also achieves a considerably improved coating adhesion or varnish adhesion, involving no significant surplus work, in addition to the advantages indicated above. In this configuration, the surface roughness described in the scope of the present invention are, in particular, suitable and can be employed advantageously. The surface roughness is in particular matched to the intended coating and for example to the requirements of the surface provided for coating.

Preferably the outer section is coated after shaping in the shaping mold, without first being subjected to an in particular abrasive surface treatment. The outer section is, in particular, coated in the state in which it had been shaped in the shaping area of the shaping mold. This configuration is particularly economic while at the same time achieving particularly optimal coating results due to the surface roughness in the shaping area. An abrasive surface treatment is in particular understood to mean, mechanical and/or non-mechanical treatments, for example machining, chemical, electrochemical, thermal treatment processes.

Preferably, at least one outwardly finishing coating, in particular varnish coating, is applied directly onto the outer section. This considerably reduces the weight. Then, the outer section is, in particular, in the state as it had been shaped in the shaping area of the shaping mold. An outwardly finishing coating is, in particular, applied without any preceding coating and for example priming coat or the like. In particular, is no filler and/or putty or the like applied previously. Trials have shown that the intentional surface roughness in the shaping area also achieves a particularly high surface quality of the coating and, in particular, a considerably improved coating adhesion. Alternately, it is possible to provide at least one coating beneath the outwardly finishing coating. For example, a primer or the like may be provided.

The shaping area is, in particular, roughened to an average roughness (Ra) of at least 1 µm and preferably at least 1.1 µm and particularly preferably at least 1.2 lam. An average roughness of at least 1.3 µm or at least 1.4 µm or at least 1.5 µm or at least 1.6 µm or at least 1.7 µm or at least 1.8 µm or at least 1.9 µm is advantageous and preferred. These lower limits for the average roughness have shown to be particularly advantageous. Alternately, average roughness of at least 0.5 µm or at least 0.6 µm or at least 0.7 µm or at least 0.8 µm or at least 0.9 µm may be provided. The average roughness in particular indicates the mean distance of a measuring point lying on the surface from a centerline. The average roughness in particular corresponds to the arithmetic mean of the quantitative deviation from the centerline. Average roughness of at least 2 µm or at least 2.2 µm or at least 2.5 µm are likewise possible and advantageous. Average roughness of at least 2.8 µm or at least 3 µm or at least 4 µm may be provided as well.

The shaping area is, in particular, roughened to an average roughness of maximally 4 µm and preferably maximally 3 µm and particularly preferably maximally 2.8 µm. It is possible and advantageous to roughen the shaping area to an average roughness of maximally 2.5 µm and preferably 2.2 µm and particularly preferably 2 µm. The average roughness may be maximally 1.9 µm or maximally 1.8 µm. These upper limits for the average roughness have shown to be particularly advantageous in tests.

Average roughness between 1.3 µm and 1.9 µm, and preferably between 1.4 µm and 1.8 µm, and particularly preferably between 1.5 µm and 1.7 µm, have shown particularly advantageous for the shaping area. For example, an average roughness of 1.6 µm is provided. Given specific alloys of the shaping mold, an average roughness of 1.8 µm has also been found advantageous. The average roughness is, in particular, also matched to the alloy of the shaping mold.

It is possible for the average roughness indicated above to include deviations in the range of +/−0.1 µm or +/−0.2 µm. It is possible and advantageous for the outer section to show a surface roughness of an average roughness as it was indicated above for the surface roughness of the shaping area.

In particular (and in particular for technical reasons), the outer section shows a surface roughness having an average roughness that is larger by a defined amount than is the average roughness for the surface roughness of the shaping area. The outer section in particular shows a surface roughness having an average roughness between 1.8 µm and 5.8 µm, and preferably between 2.8 µm and 4.8 µm, and particularly preferably between 3.5 µm and 4.0 µm. For example, an average roughness of 3.8 µm is provided for the outer portion. The outer section in particular shows a surface roughness having an averaged total profile height (Rz) between 20 µm and 30 µm, and for example 25 µm having a maximal total profile height (Rz max) of 33 µm. These values can be implemented advantageously by means of the surface roughness of the shaping area described above.

The surface roughness of the shaping area is, in particular, generated by means of at least one mechanical and/or non-mechanical abrading process. Preferably, the surface roughness of the shaping area is generated by means of at least one laser texturing method. The shaped outer section in particular shows a laser texture. This method of generating roughness is economic while also being particularly controlled.

It is likewise preferred and advantageous for the surface roughness of the shaping area to be generated by means of at least one blasting process (also referred to as blast machining) and particularly preferably by means of shot peening. This also offers an economic while also particularly controlled generating of roughness. It has been shown that under certain conditions, shot peening shows particular advantages over laser texturing. Other suitable blasting processes are likewise possible. The blasting particles employed in the blasting process may show a non-spherical geometry.

Suitable combined processes are likewise possible, e.g. shot peening and laser texturing. The processes presented in the scope of the present invention are therefore in particular disclosed in an AND/OR operation. In all the configurations, it is preferred for the shaping area to be polished prior to generating the surface roughness.

A mechanical abrading process is, in particular, understood to mean suitable cutting processes. For example, at least one chip removal process may be used. A chip removal process by means of a geometrically non-defined cutting edge is possible, such as sanding, blast machining, and preferably shot peening. Alternately, a chip removal process by means of a geometrically specified cutting edge may be provided, such as milling or the like. A non-mechanical abrading process may be provided such as thermal, chemical, electrical, and/or electrochemical abrasion. Electric discharge machining and/or etching may for example be provided. Other suitable roughening processes are likewise possible.

At least one laser is moved across the shaping area in particular by way of raster scanning and/or at various intensities and/or velocities and/or frequencies. Thus, the shaping area is in particular provided with overlay structures. The overlay structures in particular show the same, or intentionally different, surface roughness relative to the rest of the shaping area. In particular, even given different surface roughness, the average roughness for the overlay structures and the rest of the shaping area lies within the previously defined range of values. The overlay structures per se are in particular larger than the average roughness of their surface roughness, by a factor of 10 and preferably at least by a factor of 100, or even by a factor of factor 500 or more. These overlay structures allow to particularly reliably avoid imperfections in the surface of the outer section.

The overlay structures in particular comprise overlay lines. The overlay structures are in particular provided by at least one overlay line each. The overlay lines are in particular disposed at least partially spaced apart. The overlay lines in particular cross over one another, at least partially. The overlay lines may be at least partially straight or may show a curved outline. At least partially two-dimensional overlay structures are likewise possible. It is possible for the overlay structures to be at least partially (just very slightly) recessed and/or elevated relative to their surroundings.

Preferably, the shaping mold is provided with vent flues. Preferably, the vent flues are suitable and configured to inhibit the formation of air pockets and in particular air bubbles and/or dry spots (areas with insufficient matrix material) during shaping in the shaping mold. The formation of air pockets is, in particular, inhibited by providing for any air present between the shaping area and the outer section to escape along the vent flues. The formation of dry spots is in particular also inhibited by way of distributing a matrix material of the fibrous composite material (e.g. resin) through the vent flues. These vent flues achieve a particularly high-quality surface of the outer section, requiring no or nearly no post-processing after demolding.

The shaping area provided with the surface roughness may extend over the vent flues only, so that the vent flues provide the shaping area. Then, the areas of the shaping mold lying outside of the shaping area are in particular polished. Alternately, the vent flues may extend over a subrange of the shaping area. Then, the vent flues may show a surface roughness that is the same as, or intentionally different from, the rest of the shaping area. Then, the average roughness for the vent flues and for the rest of the shaping area lies in particular within the previously defined range of values. The vent flues may extend radially and/or tangentially over the rim flank.

Particularly preferably, the vent flues are provided by, or form part of, the overlay structures. The vent flues are, in particular, manufactured as has been described previously for the overlay structures. The vent flues in particular show a geometry as it has been described previously for the overlay structures. Alternately, the vent flues may be manufactured in another way.

The shaping area is preferably disposed in the shaping mold such that the outer section extends over at least 50% and preferably at least 75% of an outside surface of the component body. Alternately, the shaping area may be disposed in the shaping mold such that the outer section extends over at least 90% of the outside surface. The outer section may also extend over the entire outside surface of the component body. The outer section may be provided to extend over at least 20% or at least 30% or at least 40% of the outside surface of the component body. The areas indicated above particularly preferably refer to one outside surface of at least one rim flank and preferably of both of the rim flanks of the rim body. The areas indicated above in particular refer to an outside surface that is visible in a normal mounting state of the bicycle component.

In a particularly advantageous configuration, the shaping area is disposed in the shaping mold such that the outer section extends at least over the rim flanks. Preferably, the shaping area is disposed in the shaping mold such that the outer section is disposed at least radially beneath a brake flank and/or at least radially beneath a centerline of the rim flank. It is also advantageous and preferred to dispose the shaping area in the shaping mold such that the outer section extends at least radially above a centerline of the rim flank. The outer section is in particular so configured on both of the rim flanks. The outer section in particular extends at least over the rim flanks and/or at least over the rim base and/or at least over the rim well. This offers many advantages in manufacturing particularly high-quality rims.

In the case that the rim has at least one brake flank, the outer section in particular extends at least outside of the brake flank and preferably also over the brake flank. Alternately, the manufactured rim may not show any brake flanks and may, for example be configured as a rim for disk brakes.

It is possible for the shaping mold to show at least one brake flank shaping area disposed outside of the shaping area for forming at least one brake flank. Preferably, the brake flank shaping area is provided with friction members which are larger than the average roughness of the surface roughness of the shaping area, at least by a factor of 10 and at least by a factor of 100, or even by a factor of 500 or more. The friction members in particular comprise elevations and/or depressions. The sizes of the friction members in particular relate to the height or depth of elevations and depressions.

It is possible and advantageous to provide the friction members per se respectively the brake flank shaping area per se with a surface roughness configured as described above. Then the surface roughness in particular also extends over the brake flank shaping area. Thus, other than the braking action, the friction members also offer a particularly high-quality optical appearance, or also a particularly good adhesion for a coating. It is also possible for the friction members in the brake flank shaping area to not be provided with an intended surface roughness. Then the brake flank shaping area may, in addition to the friction members, show a reduced and/or increased surface roughness or the same surface roughness as does the shaping area. The rim, in particular, comprises at least one brake flank shaped by means of such a brake flank shaping area.

The shaping area is, in particular, provided with a continuous surface roughness. It is also advantageous for the shaping area to be provided with a constant surface roughness. A consistent average roughness is in particular provided. This allows particularly uncomplicated manufacturing of the shaping area and concurrently, manufacturing particularly uniform surfaces. Alternately, the shaping area may be provided with at least two different surface roughness values. Then, the average roughness of the different surface roughness values preferably lie within the previously defined ranges of values.

It is also possible and preferred for the shaping area to be provided with at least two or a plurality of different surface roughness values. This offers a particularly uncomplicated option of manufacturing component bodies with area sections having different degrees of dullness or gloss. It is also possible to provide for controlled influencing of the reflection characteristics of coatings, for example varnish coatings, by the different surface roughness values.

The shaping area may be provided with mold elements for shaping elevated and/or recessed ornaments on the outer section. Then the surface roughness in particular also extends over the mold elements. This provides the ornaments with a particularly high-quality optical appearance in an uncomplicated way. The ornaments in particular show the same surface roughness as does the outer section. Thus, surface imperfections are avoided in the ornaments as well, saving extensive refinishing work. Alternately, it is possible for the mold elements to be placed outside of the shaping area and/or to not be provided with the surface roughness. The ornaments in particular show structures which are larger than the average roughness of the surface roughness of the shaping area at least by a factor of 10 and preferably at least by a factor of 100 or even by a factor of 500 or more.

It is possible for the mold elements to intentionally show a lower and/or higher surface roughness than the rest of the outer section, so as to generate different degrees of gloss and/or dullness on the component body. This makes the highlighting of ornaments particularly uncomplicated. Moreover, this allows to dispense with varnish coating, so as to save weight and improve the ecobalance.

Particularly preferably, at least one surface treatment of the outer section is provided after removing the component body from the shaping mold, for reducing and/or eliminating any unevenness. This surface treatment is preferably replaced by intentionally incorporating the surface roughness into the shaping area. Thus, such surface treatment may already be replaced prior to shaping the component body. This results in considerable improvement of both manufacturing and the product.

The bicycle component according to the invention comprises at least one component body. The component body is at least partially shaped of at least one fibrous composite material in at least one shaping mold. At least one of the outer sections of the component body shows a surface roughness intentionally generated (in particular synchronously with its first-time shaping). Such a bicycle component likewise solves the object of the invention particularly advantageously.

The bicycle component according to the invention is manufactured in particular using the method according to the invention. It is also possible and advantageous for the bicycle component according to the invention to show a surface roughness generated by means of another suitable method. The surface roughness may, for example, be generated by at least one mechanical and/or non-mechanical abrading process downstream of shaping in the shaping mold. The preferred process is in particular an at least partially automated and in particular a controlled abrasive blasting process. Other abrading processes are likewise possible.

Preferably, the surface roughness of the outer section is disposed at least partially and in particular completely beneath at least one coating. The outer section is, in particular, disposed at least partially and in particular completely beneath the coating. The bicycle component in particular comprises at least one coating disposed above the surface roughness. It is also possible for the surface roughness of the outer section to be configured at least partially exposed. The outer section is in particular disposed in a part of the component body which is visible in a normal, mounted state. The outer section per se does not need to be visible.

The surface roughness is in particular configured as described above for the method. The surface roughness in particular shows the characteristics described above. The surface roughness in particular shows the parameters described above regarding the roughness and preferably the average roughness value. The surface roughness is in particular disposed on the bicycle component as described above. The coating is also in particular configured as described above. The outer section is in particular disposed and in particular configured as described above. The bicycle component is in particular at least partially provided with the properties as they are described above in the scope of the method. The bicycle component according to the invention is in particular a rim.

In the scope of the present invention, the surface roughness is in particular understood to mean a form deviation at least of the third order, preferably at least fourth order, and in particular third through fifth orders. The surface roughness is, in particular, understood to not mean a form deviation of the first and/or second orders. It is possible that the surface roughness is not understood to mean a form deviation of the third order. As regards the definition of the form deviation and/or the surface roughness, the statements according to the standard DIN 4760 (as of the application date) are in particular incorporated by reference into the disclosure in their entirety.

The surface roughness is, in particular, understood to not mean a pattern that is macroscopic and/or visible to the naked eye. The surface roughness in particular does not include any individual structural elements which are macroscopic and/or visible to the naked eye, such as elevations and/or depressions. The surface roughness is in particular understood to mean a surface characteristic which is perceptible macroscopically and/or with the naked eye, as a continuously roughened surface. The surface roughness is in particular to not mean any ornaments or individual structures that the naked eye can discern.

Providing the shaping area with the surface roughness in particular also generates an intentional surface roughness of the outer section. The outer section in particular shows a surface roughness which is generated by the surface roughness of the shaping area. The surface roughness of the outer section in particular shows the same parameters or at least approximately the same parameters as does the surface roughness of the shaping area.

The outer section is in particular disposed in an area of the component body which is visible in the finished state of the component body. The outer section disposed in the visible area may be not visible itself. The outer section may for example be disposed beneath a coating or the like. It is possible for the outer section to be visible itself.

The shaping area is, in particular, understood to mean that area of the shaping mold which forms the outer section of the component body. The shaping mold may comprise further areas for forming other sections of the component body. The outer section is, in particular, understood to mean that portion of the component body which shows a surface roughness generated by the surface roughness of the shaping area.

Preferably, the surface roughness of the shaping area is suitable and configured to inhibit the formation of air pockets and in particular air bubbles and/or dry spots (areas with insufficient matrix material) during shaping in the shaping mold. The formation of air pockets is, in particular, inhibited by providing for any air present between the shaping area and the outer section to distribute along and over the (roughened) outer section from where it can in particular escape. The formation of dry spots is, in particular, inhibited by way of distributing more evenly a matrix material of the fibrous composite material (e.g. resin) along and across the (roughened) shaping area surface. The presently described surface roughness of the shaping area may be advantageously used therefor.

Preferably, the surface roughness of the shaping area is suitable and configured to generate on the outer section a surface roughness which at least partially optically conceals or covers (visually discernible) surface imperfections of the outer section. The surface roughness of the shaping area in particular generates on the outer section a surface roughness which makes the shaping area appear optically dull or matte. The surface roughness of the shaping area in particular prevents gloss on the outer section. The presently described surface roughness of the shaping area may be advantageously used therefor.

In the scope of the present invention the surface imperfections are in particular those generated during manufacture of the component body in the shaping mold.

Further advantages and features of the present invention can be taken from the description of the exemplary embodiments which will be discussed below with reference to the enclosed figures.

DETAILED DESCRIPTION

Figure 1:
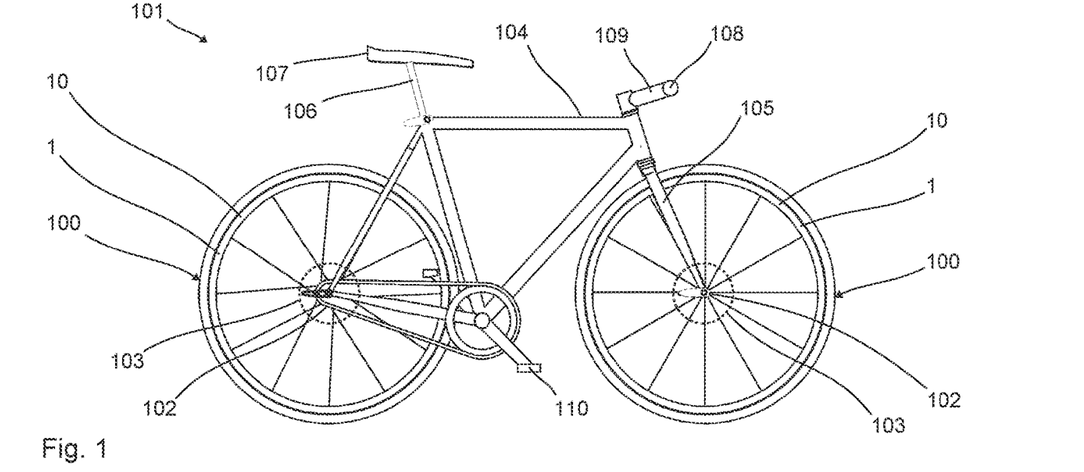
FIG. 1 a purely schematic side view of a bicycle.

FIG. 1 shows a bicycle 101 configured as a racing bicycle, with a bicycle component 10 manufactured according to the method according to the invention. The bicycle 101 may also be configured as a mountain bike or another bicycle type. In any configuration the bicycle 101 may be muscle-powered or partially muscle-powered, and it may for example be configured as an e-bike. By way of example, the bicycle component 10 is provided by the rims 1 of the wheels 100 of the bicycle 101.

The bicycle 101 comprises two wheels 100, which are provided with a hub 102 and a rim 1 each. The bicycle 101 comprises a frame 104 and a fork 105 accommodating one of the wheels 100 each. Furthermore, the bicycle 101 comprises a seat post 106 with a saddle 107 attached, and a handlebar 108 attached to the frame 104 via a stem 109. Moreover, the bicycle 101 is provided with a disk brake system with two brakes 103. This bicycle 101 comprises a chain-shifting device or derailleur as part of a pedal drive 110.

Figure 2:
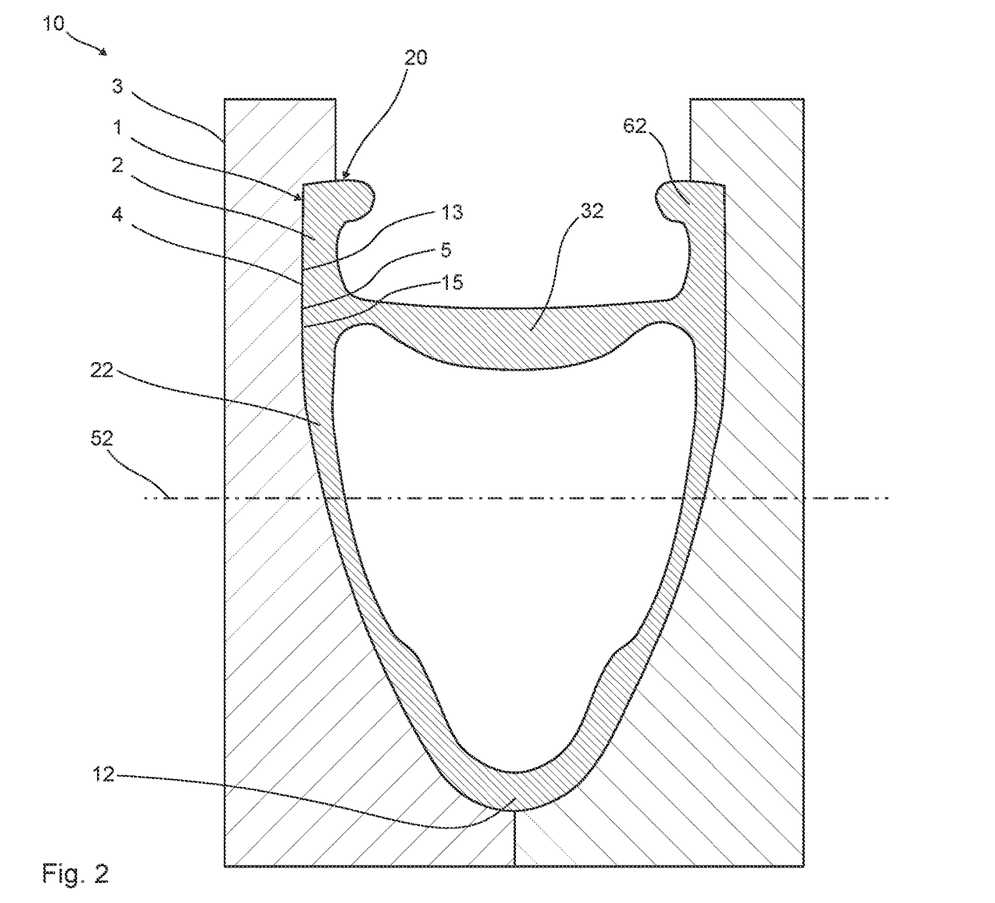
FIG. 2 a simplistic illustration of a sectional view of a bicycle component manufactured according to the invention in a shaping mold.

With reference to FIG. 2, the method according to the invention for manufacturing the bicycle component 10 is exemplarily presented in detail by way of a rim 1.

The rim comprises as the component body 20, a rim body 2, which is formed by a rim base 12 and a rim well 32, and two rim flanks 22 connecting the rim base 12 with the rim well 32. In a radially outwardly region of the rim body 2, the rim flanks 22 make a transition to rim flanges 62.

The rim 1 is formed of a fibrous composite material in a shaping mold 3, also referred to as mold. The shaping mold 3 presently shows a multipart configuration. In the illustration shown, the rim body 2 is shaped out and is still located in the shaping mold 3. Two parts of the shaping mold 3, which serve for example for shaping out the rim flanks 22, are still resting against the rim body 2. Further parts of the shaping mold 3 have already been removed.

The fibrous composite material in particular comprises at least one fibrous material and at least one matrix material. The fibrous material comprises for example carbon fibers, glass fibers, aramid fibers, or other suitable fibrous materials. The matrix material comprises for example at least one thermosetting plastic and/or at least one thermoplastic material or another suitable material. An epoxy resin may for example be employed.

In order to form the rim 1 in a particularly high surface quality, the shaping mold 3 is provided with a shaping area 13 showing an intended surface roughness 5. The shaping area 13 serves for shaping out an outer section 4 of the rim body 2. The shaping area 13 is disposed so that the outer section 4 extends along the outer respectively visible face of the rim flanks 22 and the rim base 12. The outer section 4 extends both radially above and radially beneath a centerline 52 of the rim body 2 respectively rim flanks 22.

Due to the surface roughness 5 in the shaping area 13, the shaped outer section 4 shows a particularly high-quality optical appearance free of undesirable surface imperfections. Extensive post-processing after removing from the shaping mold 3 for eliminating surface imperfections in the outer section 4 may be dispensed with.

Alternatively, the outer section 4 may only extend over part of the illustrated outside surface of the rim body 2, for example only over sections of the rim flanks 22. Then, a suitably disposed shaping area 13 is provided in the shaping mold 3.

The presently shown shaping area 13 is for example provided with a surface roughness 5 showing an average roughness Ra between 1.4 µm and 1.9 µm, and preferably an average roughness between 1.6 µm and 1.7 µm. Other suitable roughness values may be provided. The surface roughness 5 of the shaping area 13 is transferred to the outer section 4 shaped therewith.

Such a surface roughness 5 has been found to be particularly advantageous in tests. For example, undesired air pockets forming between the shaping area 13 and the outer section 4, while the rim body 2 is cured have been considerably reduced. This is a particularly advantageous effect, since it allows to reduce, and even to entirely eliminate, problematic resin-deficient zones on the visible surface. Moreover, the surface roughness 5 in the shaping area 13 also provides a considerably improved coat adhesion when subsequently varnish-coating the rim 1.

The surface roughness 5 is for example generated by laser treatment, so that the shaping area 13 receives laser texturing 15. Other methods of surface texturing in the shaping mold 3 are conceivable, for example blasting processes or the like.

The rim 1 may be provided in a structure not shown in detail, by at least two rim parts having at least one rim flank 22 each. Then, the rim parts are for example manufactured in separate shaping molds 3 having one shaping area 13 each, or successively in the shaping mold 3. Thereafter the rim parts are joined.

Figure 3:
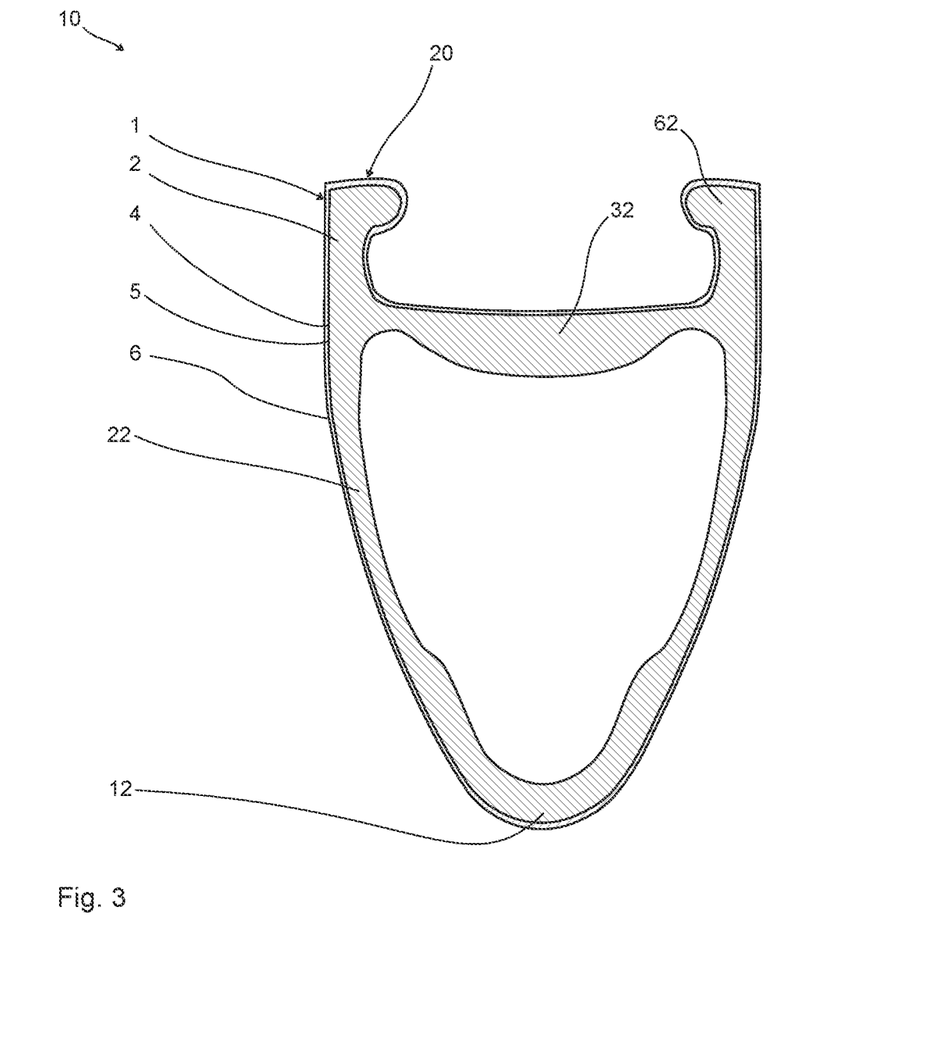
FIG. 3 a simplistic illustration of a sectional view of a bicycle component according to the invention.

FIG. 3 shows the rim body 2 described with reference to the FIG. 2 after removal from the shaping mold 3. The outer section 4 is provided with a coating 6, for example a varnish coating.

The surface roughness 5 in the shaping area 13 and the surface roughness 5 thus also formed on the outer section 4, allows application of the coating 6 without first requiring a mechanical or non-mechanical surface treatment of the outer section 4. To this end, the surface roughness 5 in the shaping area 13 is selected such that it improves the adhesion for the coating 6 applied. It is also possible for the rim 1 to already show the final optical appearance after removal from the shaping mold 3, and to not be provided with a coating 6.

The coating 6 is presently also applied in areas which are later disposed to be invisible beneath a tire.

The shown rim 1 may also be a bicycle component 10 provided with a surface roughness not generated by way of the method according to the invention. For example, the surface roughness 5 on the outer section 4 may be generated in an automated, controlled, abrasive blasting process downstream of shaping out.

Figure 4:
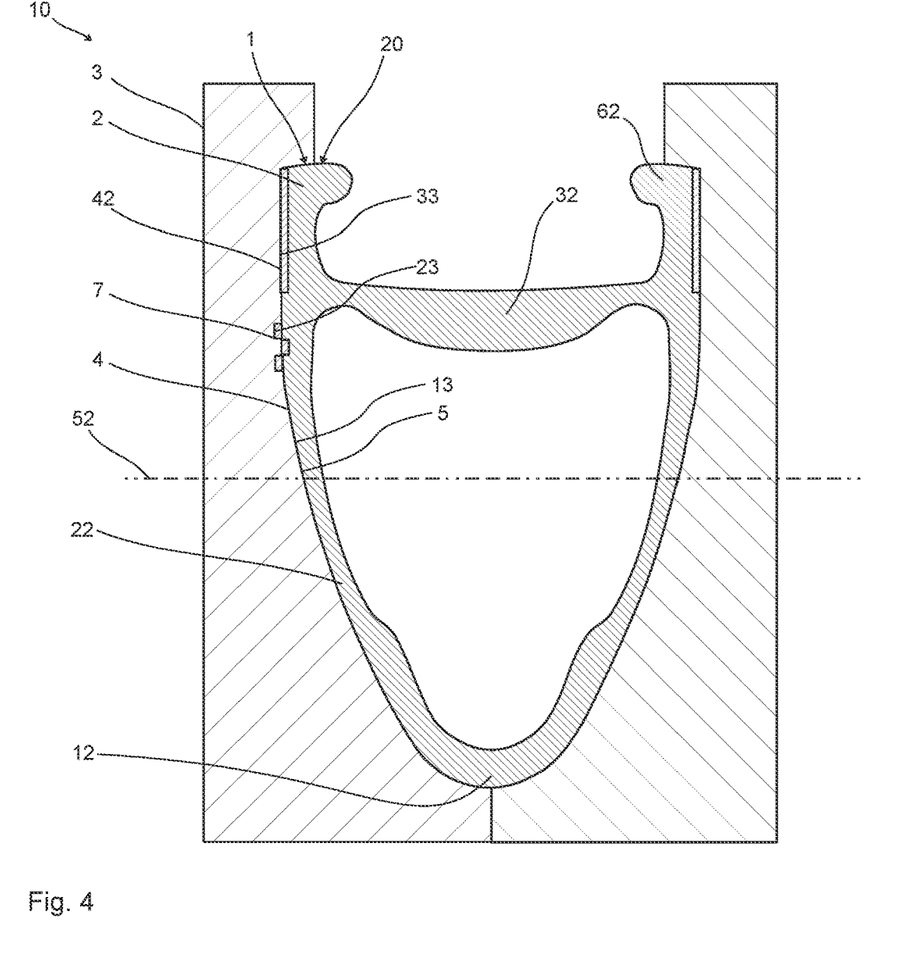
FIG. 4 a simplistic illustration of another sectional view of another bicycle component manufactured according to the invention in a shaping mold.

FIG. 4 shows a configuration of the method described with reference to FIG. 2, wherein the rim 1 is provided with brake flanks 42. In order to shape out the brake flanks 42, the shaping mold 3 is provided with brake flank shaping areas 33. In the brake flank shaping areas 33, friction members, not shown in detail, are disposed which shape out a friction surface on the rim body suitable for rim brake pads. The friction members comprise, for example elevations and/or depressions, which are more than a hundred times larger than the average roughness of the surface roughness 5 of the shaping area 13.

In relation to the desired surface quality of the brake flank 42, the brake flank shaping area 33 may likewise be provided with the surface roughness 5, or it may show another selective surface roughness 5, or none.

Additionally or alternatively, the rim 1 is provided with ornaments 7, for example lettering or a logo or the like. For generating the ornaments 7, the shaping area 13 shows mold elements 23 which serve as a shaping mold of the desired ornament 7.

Presently, the surface roughness 5 extends over the mold elements 23. Thus, the ornaments 7 likewise obtain a particularly high-quality optical appearance. Moreover, the ornaments 7 are also provided for particularly favorable adhesion for a coating 6.

Alternately, the mold elements 23 may be disposed outside of the shaping area 13, showing no surface roughness 5. Thus, for example controlled dull/glossy surfaces may be generated. Thus, it is particularly uncomplicated to highlight the ornaments 7, by an absence of a surface roughness 5.

Figure 5:
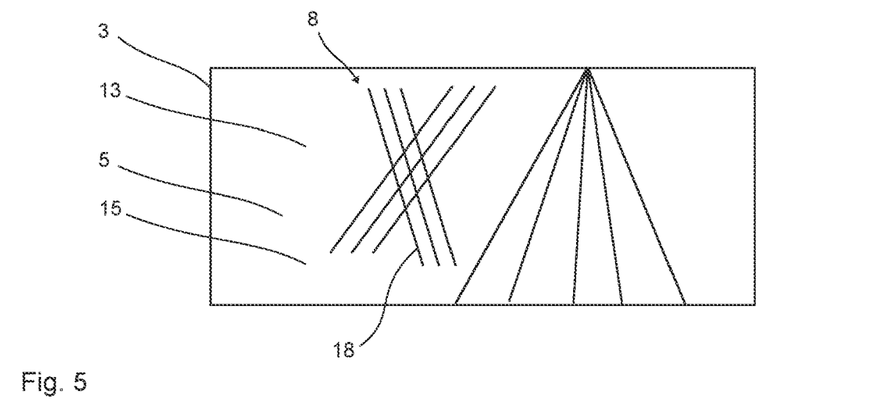
FIG. 5 a simplistic illustration of a shaping mold in a side view.

FIG. 5 shows a shaping mold 3, whose shaping area is provided with overlay structures 8 to avoid air pockets and dry spots without matrix material. The geometry of the overlay structures 8 is just schematically outlined. The overlay structures 8 are part of a laser texture 15, generated by means of controlled laser guidance respectively rasterization. The overlay structures 8 show substantially the same surface roughness 5 as does the rest of the shaping area 13. A configuration comprising an intentionally varying surface roughness 5 may be provided as required.

The shaping mold 3 is moreover provided with vent flues 18 to more effectively inhibit the formation of air pockets and dry spots. The vent flues 18 form part of the shaping area 13 and are provided by the overlay structures 8. Alternately, the vent flues may show other orientations or geometries than those shown just schematically.

The presented invention offers a considerable improvement to coat adhesion, which is also particularly uncomplicated to obtain. Moreover, a mechanical (for example grinding) or chemical (for example primer) pretreatment prior to coating may be dispensed with. Furthermore, a considerably reduced number of varnish coats is required to obtain a durable varnish coating. Thus, the manufactured bicycle component 10 has a considerably reduced weight, which is particularly advantageous in competition bicycles. Moreover, coatings 6 or varnish coatings may even be entirely dispensed with. The considerably improved optical appearance already following the shaping out allows to save sequential operations. Thus, a particularly high efficiency combined with an advantageous ecobalance is achieved. Moreover, the invention offers considerably improved reproducibility.

It has been shown that the invention also considerably improves Decal application and/or adhesion. Particular advantages have also shown in the case of single-layer varnish coating without a clear coat finish. In the scope of coating, the invention also allows flame treatment only, combined with dispensing with baking cycles, resulting in considerable savings.

Additionally or alternatively to the rim 1, another bicycle component 10 of the bicycle 101 may be manufactured, using the presently described method. For example, the hub 102, the brake 103, the frame 104, the fork 105, the seat post 106, the handlebar 108 and/or the stem 109 may represent a bicycle component 10 manufactured according to the invention, whose component body 20 is formed in a suitable shaping mold 3.

While a particular embodiment of the present method of manufacturing a bicycle component, and bicycle component, have been described herein, it will be appreciated by those skilled in the art that changes and modifications may be made thereto without departing from the invention in its broader aspects and as set forth in the following claims.

LIST OF REFERENCE NUMERALS 1 rim
2 rim body
3 shaping mold
4 outer section
5 surface roughness
6 coating
7 ornament
8 overlay structure
10 bicycle component
12 rim base
13 shaping area
15 laser texture
18 vent flue 20 component body
22 rim flank
23 mold element
32 rim well
33 brake flank shaping area
42 brake flank
52 centerline
62 rim flange
100 wheel
101 bicycle
102 hub
103 brake
104 frame
105 fork
106 seat post
107 saddle
108 handlebar
109 stem

The invention claimed is:

1. A method of manufacturing a bicycle component having at least one component body, formed at least partially of at least one fibrous composite material in at least one shaping mold comprising:
providing at least one shaping area of the shaping mold, which shapes at least one outer section of the component body; providing said at least one shaping area with at least one intended surface roughness, and that the surface roughness of the shaping area also provides an intentional surface roughness for the outer section during the generation of the outer section, to inhibit optically visible surface imperfections of the shaped outer section; wherein the shaping mold comprises at least two parts, such that the shaping area is provided on at least a portion of each of the at least two parts;
wherein the shaping area is roughened to said surface roughness uniformly across said shaping area to an average roughness (Ra) of at least 1 micrometer and maximally 4 micrometers; and
wherein the surface imperfections include at least one of: air pockets and resin-deficient zones.

2. The method according to claim 1, wherein the bicycle component manufactured is a rim for a wheel, and wherein the rim comprises at least one rim body having at least two rim flanks, providing the component body.

3. The method according to claim 1, wherein the outer section is coated after shaping, without first being subjected to an abrasive surface treatment, and wherein an outwardly finishing coat is applied directly on the outer section.

4. The method according to claim 1, wherein the surface roughness of the shaping area is generated by means of shot peening and/or by means of laser texturing, so that the shaped outer section shows a laser texture.

5. The method according to claim 4, wherein at least one laser is moved across the shaping area, by way of raster scanning and/or at various intensities and/or velocities and/or frequencies, and wherein the shaping area is thus provided with overlay structures.

6. The method according to claim 1, wherein the shaping mold is provided with vent flues, and wherein the shaping area provided with the surface roughness only extends over the vent flues, or wherein the vent flues only extend over a subrange of the shaping area.

7. The method according to claim 5, wherein the shaping mold is provided with vent flues, and wherein the shaping area provided with the surface roughness only extends over the vent flues, or wherein the vent flues only extend over a subrange of the shaping area, wherein the vent flues are provided by the overlay structures.

8. The method according to claim 1, wherein the shaping area is disposed in the shaping mold such that the outer section extends over at least 50% of an outside surface of the component body.

9. The method according to claim 2, wherein the shaping area is disposed in the shaping mold such that the outer section extends at least over the rim flanks.

10. The method according to claim 2, wherein the shaping mold comprises at least one brake flank shaping area, and wherein the brake flank shaping area is provided with friction members, which are larger than an average roughness of the surface roughness of the shaping area at least by a factor of 100.

11. The method according to claim 1, wherein the shaping area is provided with a constant surface roughness or wherein the shaping area is provided with at least two different surface roughness values.

12. The method according to claim 1, wherein the shaping area comprises mold elements for forming elevated and/or recessed ornaments on the outer section, so that the surface roughness also extends over the mold elements.

13. The method according to claim 1, wherein said surface roughness has an average roughness Ra between 1.4 µm and 1.9 µm.

14. The method according to claim 1, wherein said surface roughness has an average roughness Ra between 1.6 µm and 1.7 µm.

15. The method according to claim 1, wherein said surface roughness is obtained by shot peening.

16. A method of manufacturing a bicycle component having at least one component body, said component being a rim for a wheel, and wherein the rim comprises at least one rim body having at least two rim flanks, providing the component, formed at least partially of at least one fibrous composite material in at least one shaping mold comprising:
providing at least one shaping area of the shaping mold, which shapes at least one outer section of the component body; providing said at least one shaping area with at least one intended surface roughness by shot peening, and that the surface roughness of the shaping area also provides an intentional surface roughness for the outer section during the generation of the outer section, to inhibit optically visible surface imperfections of the shaped outer section; wherein the shaping mold comprises at least two parts, such that the shaping area is provided on at least a portion of each of the at least two parts;
wherein the shaping area is roughened to said surface roughness across said shaping area to an average roughness (Ra) of at least 1 micrometer and maximally 4 micrometers; and
wherein the surface imperfections include at least one of: air pockets and resin-deficient zones.

* * * * *